Jan. 26, 1965  D. H. BROOKS  3,167,442
METHOD OF FORMING A RESIN COATING ON METAL
Filed May 24, 1961
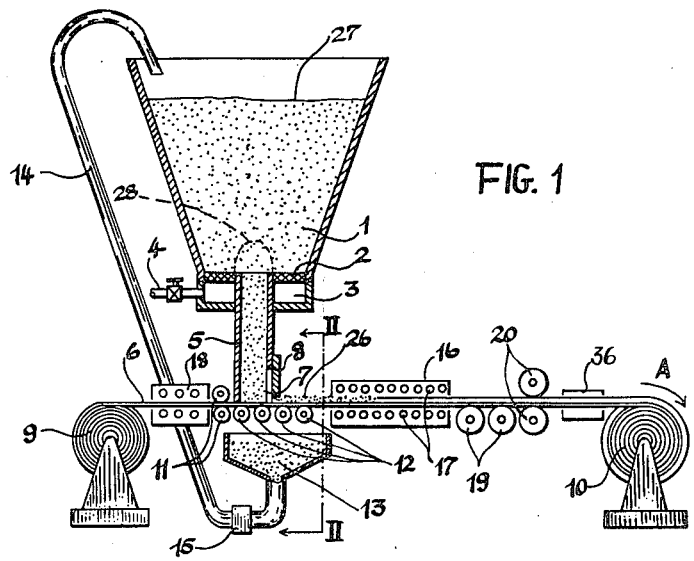
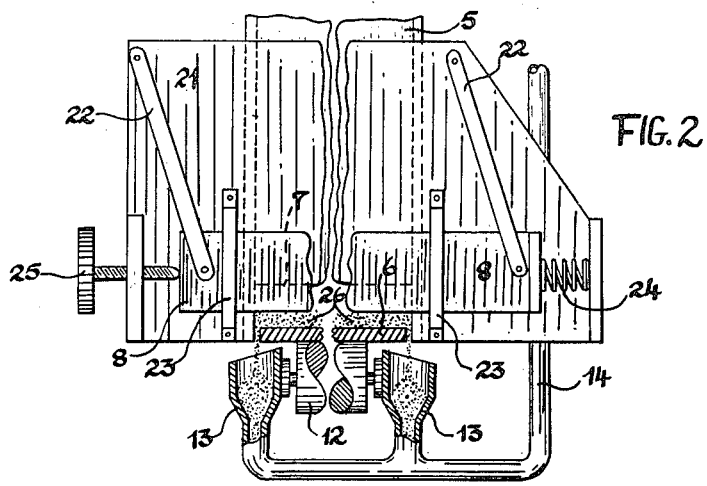
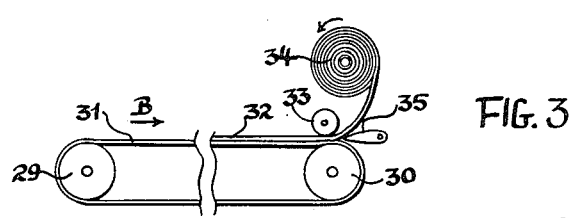
Inventor
DONALD HERBERT BROOKS

3,167,442
METHOD OF FORMING A RESIN COATING ON METAL
Donald Herbert Brooks, Northdene, Transvaal, Republic of South Africa, assignor, by mesne assignments, to International Protected Metals, Inc., a corporation of New Jersey
Filed May 24, 1961, Ser. No. 112,372
Claims priority, application Republic of South Africa, May 27, 1960, 60/2,169; Nov. 11, 1960, 60/4,593; Nov. 28, 1960, 60/4,846
3 Claims. (Cl. 117—21)

The present invention relates to feeding particulate materials, in particular to continuously producing an even, very thin layer of particulate material on a supporting surface. The invention is particularly applicable to feeding comparatively fine powders which are normally fed with difficulty in thin even layers.

It is an object of the invention to provide a process for continuously feeding powders at an even rate.

It is a further object to feed plastic powders, in particular thermoplastic resin powders, at an even rate and to overcome or mitigate the difficulties normally encountered with such powders as a result of their tendency to build up electrostatic charges.

It is a further object to feed powders in the form of an even layer on a supporting surface, more particularly to produce the said layers and subsequently to form coherent unorientated films from the said layers, e.g. by fusing.

It is the main object of the invention to continuously coat sheet material, in particular sheet metal with an even layer of coating material.

The above and other objects may be achieved in accordance with the invention by a process which comprises maintaining a continuous supply of a fine particulate material in a substantially free-flowing condition with a pressure head in a passage having a downwardly directed open end facing an upwardly directed supporting surface, maintaining said supporting surface in unidirectional movement relative to, past and underneath the said open end of the said passage, while maintaining a gap of very small height between the said lower end of the said passage and the said supporting surface, said gap facing in the direction of movement of the supporting surface thereby producing a layer having a substantially even, upper free surface of the particulate material being carried away by the surface.

The feature of maintaining a free-flowing condition is of primary importance, since it is otherwise impossible to produce the said even upper free surface.

The method may be carried out with a selected powder of a type having substantially free flowing properties in its normally settled condition. However, the method is also suitable for being carried out with other particulate materials. To produce a free flowing condition irrespective of the type of material, the particulate material is preferably maintained in an aerated condition in the said passage.

Normally the particulate material is continuously supplied to the said passage from a space of larger cross-section in which the particulate material is aerated by passing gas therethrough in an upwards direction, the intensity of aeration being below that at which substantial entrainment of the particulate material in the gas stream occurs. The exact degree of aeration is preferably adjusted to suit the particular particulate material. For example, with some powders, in particular powders largely composed of jagged particles having a tendency to interlock and form lumps, a high degree of aeration, e.g. the condition known as a fluidised bed (in the sense of a dense phase bed bounded by an upper free surface and in which the particles are in turbulent movement) is preferably employed. Normally the degree of aeration is allowed to diminish as the particulate material moves along the said passage towards the open end facing the conveying surface.

In the said passage it is preferred to maintain a static aerate state of aeration, the expression static aerate being defined as a state of aeration intermediate between that of a truly fluidised bed as defined above and the fully settled material. This condition is described in great detail in our patent application Ser. No. 846,376, filed October 14, 1959, in the name of Donald Herbert Brooks, and now abandoned.

A static aerate differs from a fluidised bed in the following important respects:

(a) The individual particles are substantially stationary, i.e. they do not move substantially relative to one another, whereas in a fluidised bed the particles are in turbulent movement;

(b) In a static aerate the material exhibits a high degree of mobility and yet has a certain angle of repose, which is, however, lower than the angle of repose of the unaerated powder, whereas in a fluidised bed there is no angle of repose.

Preferably the said movement of the supporting surface takes place continuously and evenly.

By a gap of small height is normally meant in this context a gap not more than $\frac{1}{16}$ inch high, preferably between 0.01 and 0.05 inch high.

A fine particulate material in this context is preferably a material having a particle size between 0.05 and 0.2 mm., say between 0.06 and 0.1 mm. preferably largely of the order of 0.075 mm. (approximately 200 mesh A.S.T.M.).

Preferably the process is applied to the feeding of a plastic powder, preferably a thermoplastic synthetic resin. For most applications the height of the said gap is perfectly uniform substantially over its entire width.

According to the preferred method the individual particles forming the ribbon of particulate material carried away by the supporting surface from the said gap are caused, while supported by the supporting surface, to adhere to one another in the form of a continuous layer. This is preferably achieved by the application of heat above the sintering temperature of the particles. Preferably, sufficient heat is applied to cause complete fusing of the particulate material into a smooth and even layer.

According to one modification of the last-mentioned process, the powder is applied and fused onto a surface to which the material will not adhere and the fused film thus formed is allowed to solidify and is subsequently peeled off in the form of an unorientated self-supporting film. The term "unorientated" means that the physical properties of the film when measured in different directions are substantially uniform, a characteristic which differentiates the product from films produced by most existing processes.

The most important application of the present process relates to the coating of continuous strip material, e.g. sheet metal, in which case the surface to be coated of the strip material is directly used as the said supporting surface and the particulate material is caused to adhere and be bonded to the surface being coated after having been spread thereon in the manner specified above. This is also normally achieved by applying heat and causing the particulate material to fuse onto the surface of the strip material. It is possible to pre-heat the strip material prior to the application of the fine particulate material, however, it is preferred to apply at least a substantial part of the heat after the particulate material has already been applied, e.g. by any one of a variety of methods of resistance heating in which the strip metal itself serves as the heating resistance (e.g. induction heating or direct passage of a current through the strip material).

From the above and the following a person duly skilled in the art will be able to devise a variety of means for putting the process into effect. Preferably, however, the process is carried out with a specially designed powder spreading apparatus in accordance with the invention, which comprises a supply vessel for particulate material communicating at its lower end with a downwardly leading feed duct, the lower end of which is close to and faces the upwardly directed surface of a member onto which the particulate material is to be deposited and guiding and transporting means for conveying the said member immediately underneath and past the said open end of the duct in unidirectional movement relative thereto, a recess being provided at the lower end of the feed duct so as to provide an enlarged gap between the feed duct and the surface onto which the particulate material is to be spread, facing in the direction of movement.

The preferred apparatus furthermore comprises means for loosening up the particulate material inside the supply vessel prior to its entrance into the feed duct. Such loosening up means may for example take the form of a gas-pervious bed support forming at least part of the bottom of the supply vessel, and separating a gasbox having a gas-inlet from the supply vessel proper.

The preferred apparatus is adapted for the continuous coating of strip metal by the feature that the strip metal serves as the member onto which the particulate material is to be applied, means being provided for the continuous transportation and guidance of the said strip metal underneath the open end of the feed duct.

Preferably the lower end of the feed duct comprises a gate by means of which the height of the gap between the said lower end and the surface to which the particulate material is to be applied is adjustable.

For the purpose of coating continuous lengths of strip metal, the apparatus may comprise supporting and guide rollers underneath the feed duct. Furthermore a pair of feed rollers or similar means may be provided for pushing the strip metal through the machine. In addition, a feeding reel and a take-up reel for the coated strip metal may be provided, either as part of the apparatus proper or as separate units.

Underneath the strip metal being coated overflow vessels may be provided to collect powder falling off the sides of the strip metal during and after its passage underneath the feed duct. Means for recycling this overflow back to the supply vessel are preferably also provided. The apparatus preferably also comprises a fusing zone, preferably of the type comprising induction coils for fusing the powder after its application to the sheet metal. A pre-heating zone, e.g. of similar design to the fusing zone proper, may precede the feed duct and may be used to preheat the sheet metal, preferably to a temperature just below the sintering temperature of the particulate material. Preferably the fusing zone proper is followed by a cooling or chilling zone, e.g. comprising cooled rollers over which the sheet metal passes. Embossing rollers for embossing a pattern into the coating may also be provided at a locality at which the coating will normally still be soft, and these in turn may be followed by a final quenching zone.

The above-described strip coating apparatus may also easily be adapted to the purpose of manufacturing unsupported unorientated film by the mere substitution of an endless belt having a surface to which the film-forming material will not permanently adhere for the length of sheet metal passing through the apparatus and by providing means for peeling the completed film off the surface of the endless belt.

The invention and the manner in which it may be put into practice will be further described by way of example with reference to the accompanying drawings in which:

FIG. 1 represents a diagrammatic vertical longitudinal section through a strip coating plant in accordance with the invention;

FIG. 2 represents a more detailed section along line II—II in FIG. 1;

FIG. 3 illustrates diagrammatically the modifications necessary to the plant in accordance with FIG. 1 for use as a film making plant.

Referring to FIGS. 1 and 2 of the drawings the apparatus comprises a powder supply vessel 1 tapering downwards towards a gas-pervious bed support 2 separating the powder supply vessel from a gasbox 3, provided with gas inlet 4. A feed duct 5 leads downwards from the supply vessel through the gas box, and its lower open end faces the upper surface of the sheet metal 6, which is to be coated and which passes immediately underneath the feed duct in the direction of the arrow A. The feed duct has a width at least corresponding to the width of the strip metal, and it is provided on the side facing in the direction of arrow A with a recess 7 providing an enlarged gap between the lower end of feed duct 5 and the sheet metal 6, the effective height of which gap may be controlled by means of the gate 8. The sheet metal is fed from a feeding reel 9 to a take-up reel 10. Its passage is assisted by a pair of feed rollers 11, and supporting rollers 12 serve to keep the level of the sheet metal constant during its passage underneath the feed duct 5. Collecting vessels 13 are provided on both sides of the sheet metal in the vicinity of the duct 5 to collect powder falling off the sides of the strip metal, which excess powder is returned to the supply vessel 1 through a return pipe 14, motivated by a pump or blower 15.

For the production of thermoplastic coatings a fusing zone 16 is provided behind the feed duct 5, e.g. operating with induction coil 17. A pre-heating zone 18, also provided with induction coils, is provided in advance of the feed duct 5 to pre-heat the sheet metal to a temperature just below the sintering temperature to the powder. The rollers 19 behind the fusing zone 16 are water-cooled and serve to chill the sheet material. Before the sheet material has been completely chilled it passes between a pair of embossing rollers 20, followed by a final chilling zone 36 of any suitable type.

Referring now particularly to FIG. 2, the gate 8 is suspended from a gate mounting plate 21 by a parallelogram linkage 22. Guide brackets 23 press the gate against the gate mounting plate. The gate is spring-loaded at 24 towards its closed position, whereas the setting screw 25 allows the gate to be opened with great accuracy to the desired extent against the said spring-loading.

The setting of the gate 8 controls the thickness of the powder layer 26 being carried away by sheet metal 6 from the gap 7.

In operation air or an inert gas is passed through gas inlet 4 into the airbox from where it passes through bed support 2 and brings the bulk of the powder in the supply vessel 1 into an aerated condition, normally a fluidised state in which the individual particles carry out a turbulent movement, but well below the limit at which the upper free surface 27 of the fluidised bed disappears and the powder becomes substantially entrained in the gas stream. Immediately above the feed duct 5 there is a locality of slightly less intense aeration indicated by the dotted line 28. From there downwards the degree of aeration decreases as the powder descends through the feed duct 5. The powder is carried away in the form of a perfectly uniform layer 26 which is subsequently fused in fusing zone 16.

Referring now particularly to FIG. 3, the feed and take-up reels 9 and 10 respectively in FIG. 1 are replaced by end pulleys 29 and 30, at least one of which is motor-driven. The place of the sheet metal 6 is taken by an endless belt 31 passing around the end pulleys 29 and 30. The endless belt 31 may, for example, be a stainless steel belt, the surface of which is preferably highly polished and may be pre-treated in any manner to prevent the adherence thereto of film-forming material. The fused film 32 is produced in exactly the same manner at the coating of the sheet metal in FIG. 1. When the film reaches end pulley 30 it is pulled around roller 33 and wound onto a reel 34. If necessary a scraper blade 35 may also be provided.

When operating the means described above with selected powders which are free-flowing by nature, in particular powders the particles of which are substantially free of jagged and interlocking contours, e.g. largely composed of approximately spherical particles, the flow of the aerating medium may be reduced to a minimum or even be shut off completely and the method will still produce satisfactory results.

I claim:

1. A method of feeding a fine particulate material in the form of a thin uniform layer on a moving heated metal base comprising producing a dense-phase aerated bed of discrete, dry, non-tacky thermoplastic resin particles by passing an areating gas upwardly therethrough, producing a confined column of said dense-phase aerated particles from said areated bed below the bed with its upper end in communication with the bottom of said aerated bed, supporting the lower end of said column on the moving metal base, maintaining the supported column in an areated condition such that its degree of aeration is less than that of the aerated bed and diminishes beginning from its upper end in the direction of its lower end under sufficient aeration to render the particles of the column in a free-flowing condition, and depositing particles from the bottom of said column in the form of a uniform thin coating layer on the base by means of the movement of the base away from the column and the pressure head exerted by the confined particulate material.

2. A method of feeding fine particulate material according to claim 1, comprising heating the moving base to a temperature sufficient to fuse the resin onto the base.

3. A method of feeding fine particulate material according to claim 2, comprising subjecting the coating layer while at least partly fused to roller action.

References Cited by the Examiner

UNITED STATES PATENTS

| | | | |
|---|---|---|---|
| 95,974 | 10/69 | Benton | 118—413 X |
| 2,207,822 | 7/40 | Rooney et al. | 18—15 |
| 2,513,434 | 7/50 | Tinsley. | |
| 2,681,637 | 6/54 | Simpson | 118—308 |
| 2,755,197 | 7/56 | Estel | 117—9 |
| 2,770,556 | 11/56 | Grangaard et al. | 118—312 X |
| 2,844,489 | 7/58 | Gemmer | 117—23 X |
| 2,924,489 | 2/60 | Beckmann | 302—53 |
| 2,943,599 | 7/60 | Heck | 118—308 |
| 2,969,038 | 1/61 | Neumann | 118—429 |
| 2,972,501 | 2/61 | Feinman | 302—29 |
| 3,019,126 | 1/62 | Bartholomew | 117—17 |
| 3,032,816 | 5/62 | Zimmerli | 117—21 X |
| 3,067,469 | 12/62 | Yarrison | 117—21 |

FOREIGN PATENTS

| | | |
|---|---|---|
| 729,799 | 5/55 | Great Britain. |
| 773,375 | 4/57 | Great Britain. |
| 188,096 | 2/56 | Austria. |
| 1,051,815 | 3/59 | Germany. |

WILLIAM D. MARTIN, *Primary Examiner.*

MICHAEL V. BRINDISI, *Examiner.*